(12) United States Patent
Tanizawa et al.

(10) Patent No.: US 9,356,780 B2
(45) Date of Patent: May 31, 2016

(54) DEVICE, METHOD, AND SYSTEM FOR ENCRYPTED COMMUNICATION BY USING ENCRYPTION KEY

(71) Applicant: Kabushiki Kaisha Toshiba, Minato-ku (JP)

(72) Inventors: Yoshimichi Tanizawa, Yokohama (JP); Hideaki Sato, Yokohama (JP); Ririka Takahashi, Setagaya-ku (JP); Shinichi Kawamura, Kodaira (JP); Shinya Murai, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 16 days.

(21) Appl. No.: 14/189,032

(22) Filed: Feb. 25, 2014

(65) Prior Publication Data

US 2014/0365774 A1    Dec. 11, 2014

(30) Foreign Application Priority Data

Jun. 11, 2013    (JP) ................................ 2013-122410

(51) Int. Cl.
*H04L 29/06*    (2006.01)
*H04L 9/08*    (2006.01)

(52) U.S. Cl.
CPC .............. *H04L 9/0852* (2013.01); *H04L 63/06* (2013.01)

(58) Field of Classification Search
CPC .................................................... H04L 9/0852
See application file for complete search history.

(56) References Cited

U.S. PATENT DOCUMENTS

| | | | | |
|---|---|---|---|---|
| 7,441,267 B1* | 10/2008 | Elliott | ................. | H04L 63/0428 713/153 |
| 7,646,873 B2 | 1/2010 | Lee et al. | | |
| 7,734,757 B2 | 6/2010 | Maeda et al. | | |
| 8,774,415 B2* | 7/2014 | Baba | ..................... | H04L 63/062 380/279 |
| 8,885,828 B2* | 11/2014 | Wiseman | ............... | H04B 10/70 380/256 |
| 2005/0259825 A1* | 11/2005 | Trifonov | ....................... | 380/277 |
| 2006/0062392 A1* | 3/2006 | Lee | ....................... | H04L 9/0852 380/278 |
| 2007/0110454 A1* | 5/2007 | Maeda | ................. | H04B 10/548 398/188 |
| 2007/0230688 A1* | 10/2007 | Tajima et al. | ................... | 380/30 |
| 2008/0147820 A1* | 6/2008 | Maeda | ................. | H04L 9/0858 709/213 |

(Continued)

FOREIGN PATENT DOCUMENTS

JP    2008-154019    7/2008

OTHER PUBLICATIONS

Maeda, W.; Tanaka, A.; Takahashi, S.; Tajima, A.; Tomita, A.; "Scalable QKD Network Using Simple Key-Management Technique with On-Demand Crypto-Key Supply", 34th European Conference on Optical Communication, Sep. 21-25, 2008, pp. 1-2.*

Maeda, Wakako; Tanaka, Akihiro; Takahashi, Seigo; Tajima, Akio; Tomita, Akihisa; "Technologies for Quantum Key Distribution Networks Integrated With Optical Communication Networks", IEEE Journal of Selected Topics in Quantum Electronics, vol. 15, Issue 6, Oct. 30, 2009, pp. 1591-1601.*

(Continued)

*Primary Examiner* — Victor Lesniewski
(74) *Attorney, Agent, or Firm* — Oblon, McClelland, Maier & Neustadt, L.L.P

(57) ABSTRACT

A communication device assigns a key taking the degree of priority of applications into account in a case where a key generation/sharing system in which a plurality of applications are connected to a node is not able to realize key assignment that satisfies the key rates requested by the plurality of applications. For example, the device realizes a method of assigning an application key that takes the degree of priority into account according to which control is performed in such a way that the key rate requested by an important application is preferentially satisfied.

8 Claims, 8 Drawing Sheets

(56) References Cited

U.S. PATENT DOCUMENTS

| | | | |
|---|---|---|---|
| 2009/0240913 A1* | 9/2009 | Obana et al. | 711/216 |
| 2009/0316910 A1* | 12/2009 | Maeda | H04L 9/0855 380/279 |
| 2011/0243331 A1* | 10/2011 | Yasuda et al. | 380/279 |
| 2012/0213371 A1* | 8/2012 | Bush et al. | 380/278 |
| 2013/0251145 A1* | 9/2013 | Lowans | H04L 9/0838 380/44 |
| 2014/0112478 A1* | 4/2014 | Arahira | 380/278 |

OTHER PUBLICATIONS

U.S. Appl. No. 14/184,907, Feb. 20, 2014, Yoshimichi Tanizawa, et al.

O. Maurhart, "QKD Networks Based on Q3P", Applied Quantum Cryptography, Lect. Notes Phys. 797, DOI 10.1007/978-3-642-04831-9, Chapter 8, 2010, 21 pages.

Mehrdad Dianati, et al., "Architecture and protocols of the future European quantum key distribution network", Security and Communication Networks, DOI 10.1002/sec.13, 2008, 18 pages.

* cited by examiner

| APPLICATION ID | DEGREE OF PRIORITY ($P_i$) | KEY REQUEST RATE ($R_i$) | KEY ASSIGNMENT RATE ($A_i$) |
|---|---|---|---|
| 10.0.0.101:9876 | 1 | 20 Kbps | 20 Kbps |
| 10.0.0.105:8767 | 10 | 10 Kbps | 10 Kbps → 0 Kbps |
| 10.0.0.103:7170 | 5 | 20 Kbps | 20 Kbps |
| 10.0.0.101:5462 | 4 | 10 Kbps | 10 Kbps |
| 10.0.0.108:9201 | 3 | 20 Kbps | 20 Kbps |

| APPLICATION ID | DEGREE OF PRIORITY ($P_i$) | KEY REQUEST RATE ($R_i$) | MINIMUM KEY REQUEST RATE ($M_i$) | KEY ASSIGNMENT RATE ($A_i$) |
|---|---|---|---|---|
| 10.0.0.101:9876 | 1 | 20 Kbps | 10 Kbps | 20 Kbps |
| 10.0.0.105:8767 | 10 | 10 Kbps | 5 Kbps | 10 Kbps → 5 Kbps |
| 10.0.0.103:7170 | 5 | 20 Kbps | 0 Kbps | 20 Kbps → 15 Kbps |
| 10.0.0.101:5462 | 4 | 10 Kbps | 10 Kbps | 10 Kbps |
| 10.0.0.108:9201 | 3 | 20 Kbps | 10 Kbps | 20 Kbps |

651

DEVICE, METHOD, AND SYSTEM FOR ENCRYPTED COMMUNICATION BY USING ENCRYPTION KEY

CROSS-REFERENCE TO RELATED APPLICATION

This application is based upon and claims the benefit of priority from Japanese Patent Application No. 2013-122410, filed on Jun. 11, 2013; the entire contents of which are incorporated herein by reference.

FIELD

Embodiments described herein relate generally to a communication device, a communication method, and a communication system.

BACKGROUND

There are two networks (a key sharing network, an application network) for a key generation/sharing system. The key sharing network is configured from a plurality of nodes that are interconnected by a plurality of links into a network. Each node includes a function of generating and sharing a random number with a correspondent node connected by a link, and a function of performing encrypted communication over the link by using the random number that is generated and shared as an encryption key (hereinafter, a link key). Also, some of the nodes include a function of generating an encryption key (hereinafter, an application key) which is a random number independently of the link, and a function of transmitting the application key to another node over a link.

An application includes a function of acquiring an application key from a node, and performing encrypted data communication with another application by using the acquired application key as an encryption key. The encrypted data communication here may be realized by a network (an application network) different from the key sharing network, such as the Internet. Also, the node and the application may be realized in an integrated manner. The node and the application may also be configured as independent terminals, and the application key may be transmitted/received between the two.

The function of the node of generating and sharing a random number (a link key) with a correspondent node connected by a link may also be realized by a technique generally called quantum cryptography or quantum key distribution (QKD), for example.

In the key generation/sharing system, one of the most important resources is the key. Accordingly, with a node connected with a plurality of applications, the method of assigning an application key to each application (a key assignment method) is important. For example, a situation where key assignment that satisfies the volume requested by an application (key request rate) fails during system operation has to be handled appropriately.

BRIEF DESCRIPTION OF THE DRAWINGS

FIG. 6 is a diagram illustrating an example configuration of application-related information according to a modification;

DETAILED DESCRIPTION

According to an embodiment, a communication device includes a storage unit and a determiner. The storage unit is configured to store therein a degree of priority and a first requested volume for each of one or more applications that use an encryption key. The first requested volume indicates a volume of the encryption key requested by the each of one or more applications. The determiner is configured to determine a volume of the encryption key to be assigned to each application in such a way that a first total value that is a total of the volume of the encryption key to be assigned to the application is equal to or smaller than a second total value that is a total value of a volume of the encryption key assignable and that the encryption key of the first requested volume is preferentially assigned to the application whose degree of priority is higher.

Hereinafter, a preferred embodiment of a communication device according to the present invention will be described in detail with reference to the appended drawings.

Although not a method of assigning an application key to an application, as the method of assigning a link key, the following methods are known.

M1: A method of assigning a link key to a transmission key buffer and a reception key buffer In this method, assignment to a buffer with a currently small amount of accumulation is prioritized.

M2: A method of assigning a link key to an application

In this method, a key request rate is set in a node for each application in advance, and a link key is assigned to an application based on the key request rate.

However, these conventional techniques do not consider a method of handling a situation where key assignment satisfying key rates requested by a plurality of applications is not realized due to, for example, addition of a new application during system operation or a change in the volume of a requested application key (key request rate).

A communication device of the present embodiment assigns a key taking the degree of priority of applications into account in a case where a key generation/sharing system in which a plurality of applications are connected to a node is not able to realize key assignment that satisfies the key rates requested by the plurality of applications. For example, the present embodiment realizes a method of assigning an application key that takes the degree of priority into account according to which control is performed in such a way that the key rate requested by an important application is preferentially satisfied.

As described, the present embodiment relates to a method of a node for assigning an application key to an application (a method of securing, at a node, an application key for a specific application in advance for dedicated use by the application).

Figure 1:
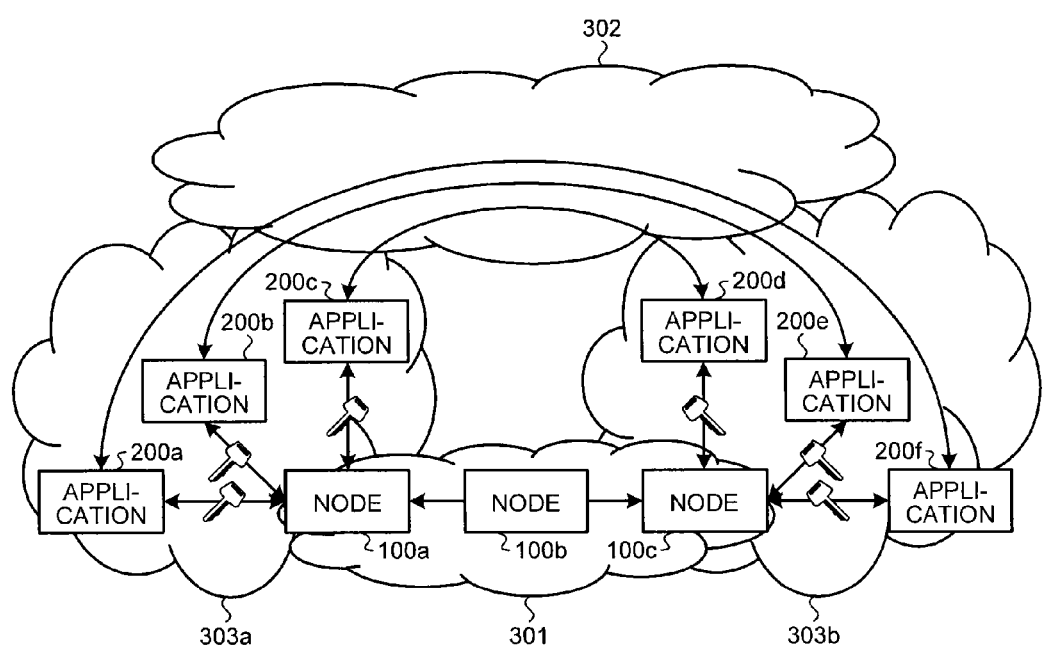
FIG. 1 is a network configuration diagram of a communication system according to an embodiment.

FIG. 1 is a diagram illustrating an example network configuration of a communication system according to the present embodiment. The communication system includes a key sharing network 301, an application network 302, and private networks 303a and 303b. Also, the communication system includes nodes 100a to 100c and applications 200a to 200f as communication devices.

In the case where there is no need to distinguish between the nodes 100a to 100c, they may simply be referred to as the node(s) 100. In the case where there is no need to distinguish between the applications 200a to 200f, they may simply be referred to as the application(s) 200. The number of nodes 100 is not limited to three. Also, the number of applications 200 is not limited to six. FIG. 1 illustrates an example where the node 100 and the application 200 are independently realized.

The private networks 303a and 303b are each a network for connecting a node 100 and an application 200 to which an application key is to be provided by the node 100.

As described above, the nodes 100a to 100c each have a function of generating and sharing a random number with a correspondent node, and a function of performing encrypted communication over a link by using the generated random number as a link key.

The node 100 may also include a function of generating a random number independently of the link, and a function of transmitting the generated random number to another node.

Figures 2, 3:
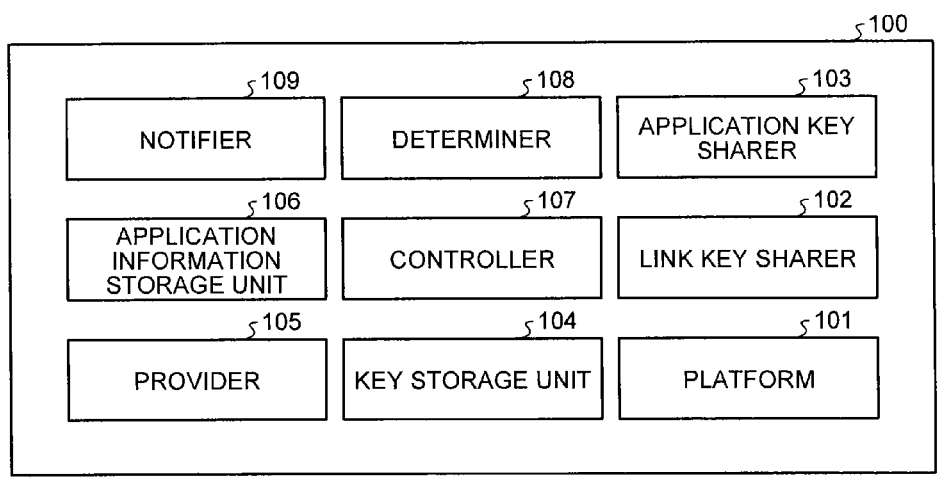
FIG. 2 is a block diagram illustrating an example configuration of a node according to the embodiment.
FIG. 3 is a diagram illustrating an example configuration of application-related information.

FIG. 2 is a block diagram illustrating an example configuration of the node 100 according to the present embodiment. The node 100 includes a platform 101, a link key sharer 102, an application key sharer 103, a key storage unit 104, a provider 105, an application information storage unit 106, a controller 107, a determiner 108, and a notifier 109.

The platform 101 realizes basic process management function, network function, security function, data accumulation function and the like, as an operating system of a computer realizing the node 100.

The link key sharer 102 shares a link key with another node 100 that is directly connected, by using a quantum key distribution technique or the like. The application key sharer 103 exchanges and shares an application key with another node 100 (a node which is directly connected or a node which is not directly connected). The application key sharer 103 also performs control necessary for exchanging the application key.

The key storage unit 104 stores the link key and the application key. The provider 105 is a communication interface to the application 200. The provider 105 processes a communication start request from the application 200, or the like, for example, and provides an application key in response to an application key request.

The application information storage unit 106 stores application-related information. For example, the application information storage unit 106 stores information such as A1 and A2 below as "application-related information" in association with an application 200 (identification information thereof).

A1: The requested volume of key (key request rate) of an application 200: the requested volume is expressed in the form of a throughput such as 100 Kbps, in the form of a necessary volume of key in unit of specific time such as 50 KBytes/3 minutes, or in the form of a total necessary volume of key such as 10 MBytes, for example. These pieces of information may be included in a message transmitted to the node 100 at the time of the application 200 connecting to the node 100. The node 100 may set the key request rate based on the information included in the message. Alternatively, the node 100 or the administrator of the system may set the key request rate of each application 200 in the node 100 in advance. Moreover, in any of the methods, the value of the key request rate may be changed during system operation.

Additionally, other than the so-called key request rate, there may be several types of key request rates of the application 200, such as a minimum key request rate whose value should not be fallen below.

A2: The degree of priority of an application 200: the degree of priority is expressed by a numerical value, for example, and its size indicates how important key assignment to an application 200 is in the system, and whether key application should be prioritized. For example, the degree of priority may be higher as the value is smaller, and the degree of priority may be lower as the value is greater, or the reverse is also possible. Information about the degree of priority may be included in a message transmitted to the node 100 at the time of the application 200 connecting to the node 100. The node 100 may set the degree of priority based on the information included in the message. Alternatively, the node 100 or the administrator of the system may set the degree of priority of each application 200 in the node 100 in advance. Moreover, in any of the methods, the value of the degree of priority may be changed during system operation.

FIG. 3 is a diagram illustrating an example configuration of the application-related information. As illustrated in FIG. 3, the application-related information includes an application ID, the degree of priority ($P_i$), a key request rate ($R_i$), and a key assignment rate ($A_i$).

The application ID is information for identifying an application 200. For example, the application ID is information for identifying an application 200 that is currently connected and is performing communication. Any form may be used as long as consistency is secured, and for example, an IP address, a port, or the like of a transmission source used for connection by the application 200 may be used, as illustrated in FIG. 3.

The degree of priority ($P_i$) and the key request rate ($R_i$) are as described above. The key assignment rate $A_i$ indicates the volume of application key (key rate) that is currently actually assigned to an application 200.

These pieces of information may be changed any time. Also, when a new application 200 is added (connected), an entry of the application-related information is newly added (for example, application-related information 351 in FIG. 3).

Additionally, the application information storage unit 106 may store a total volume of key rate T, which is the total value of the volume of application key that may be assigned (a second total value). The total volume of key rate T may be held for each set of applications 200, for example.

A set of applications 200 is one or more applications 200 that may use an application key shared with the same node 100. The node 100 shares an application key with a plurality of nodes 100. Thus, in the case where an application which is an encrypted communication counterpart is connected to a different node, the application 200 may not be assigned with, and use, the same application key. A set of applications 200 which may be assigned with, and use, the same application key is a group of applications where an application 200 is connected to a certain node 100a and an application 200 which is an encrypted communication counterpart is connected to a certain node 100c. Additionally, FIG. 3 illustrates a set of applications 200 which may all use the same application key. The node 100 may hold similar information (that is, the total volume of key rate and the application-related information) for a set of applications 200 that use different application keys (that is, applications 200 that are assigned with, and use, application keys shared with different nodes).

Referring back to FIG. 2, the determiner 108 refers to the application-related information and the like held by the application information storage unit 106 and executes an algorithm described below, to thereby determine a key assignment method (policy) that takes the degree of priority into account.

The controller 107 is notified of the key assignment method that is determined.

The controller 107 controls the entire node 100. The controller 107 performs the process of actually assigning the application key shared by the application key sharer 103 to each node 100 according to the assignment method determined by the determiner 108, for example.

The notifier 109 transmits a notification message indicating that the key assignment state (key assignment volume) has changed (a key assignment state change notification), to an application 200 for which the key assignment volume is changed when complying with the assignment method determined by the determiner 108.

Additionally, the platform 101, the link key sharer 102, the application key sharer 103, the provider 105, the controller 107, the determiner 108, and the notifier 109 may be realized by causing a processing device such as a CPU (Central Processing Unit) to execute programs, that is, by software, or by hardware such as an IC (Integrated Circuit) or the like, or by a combination of software and hardware, for example.

Also, the key storage unit 104 and the application information storage unit 106 may be configured by any storage medium that is generally used, such as a HDD (Hard Disk Drive), an optical disk, a memory card, a RAM (Random Access Memory), or the like, for example.

Figure 4:
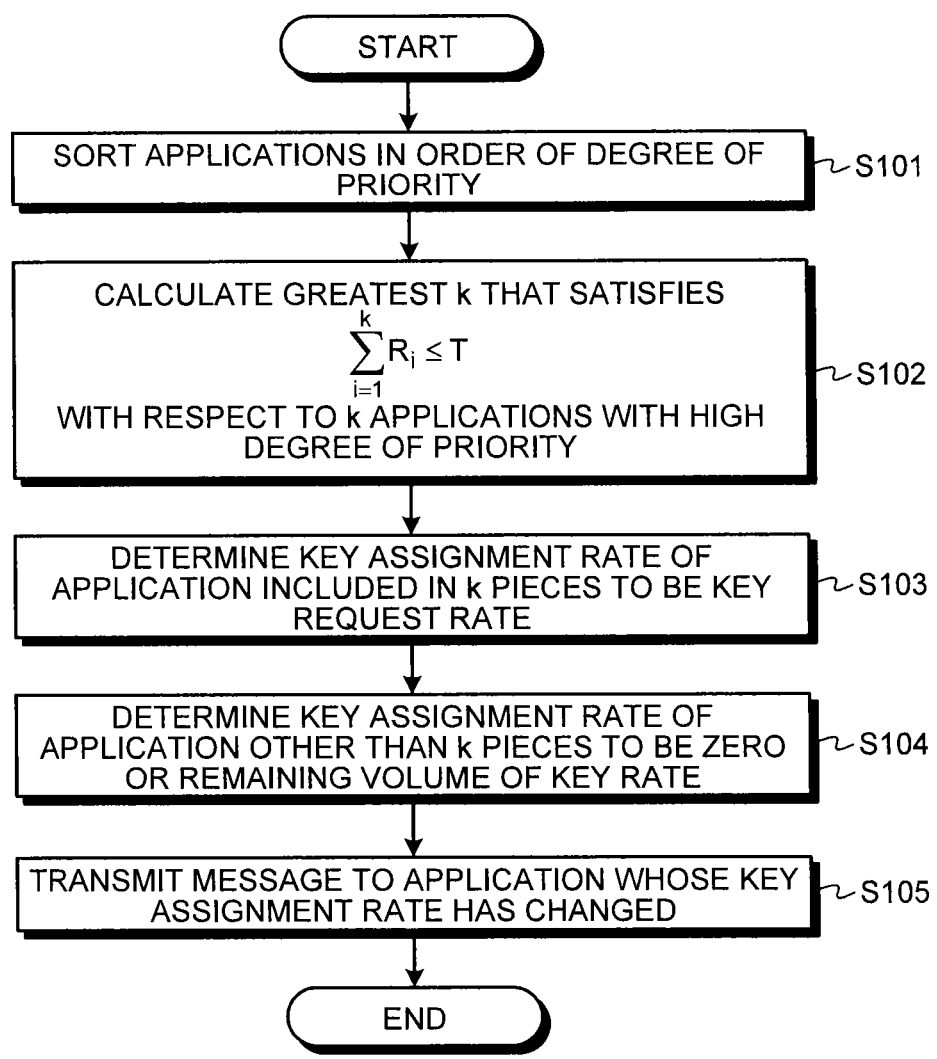
FIG. 4 is a flow chart of a key assignment process according to the embodiment.

Next, a key assignment process by the node 100 according to the present embodiment configured in the above manner will be described with reference to FIG. 4. FIG. 4 is a flow chart illustrating an example of the key assignment process according to the present embodiment. FIG. 4 illustrates a key assignment algorithm according to the present embodiment. This algorithm is executed when an application 200 is newly added, or when information about the degree of priority and key request rate of an application 200 is changed, or when the total volume of key rate T that may be assigned is changed by a certain amount or more.

The determiner 108 sorts the applications 200 in the descending order of the degree of priority $P_i$ (step S101). The determiner 108 calculates the greatest k that satisfies Inequality (1) below with respect to k applications (1≤k≤N, N is the total number of applications) with high degree of priority $P_i$ (step S102).

$$\sum_{i=1}^{k} R_i \leq T \quad (1)$$

The determiner 108 determines the key assignment rate of each application 200 included in the k pieces as the key request rate of the application 200 (step S103). The determiner 108 determines the key assignment rate of an application 200 not included in the k pieces to be zero or the remaining volume of key rate (step S104). The remaining volume of key rate is the value obtained by subtracting the total value of the key request rates of the k applications 200 from the total volume of key rate T.

In this manner, the key request rates are summed up in order from the application 200 with high degree of priority. The key assignment rate for an application 200 is the value of the key request rate itself while the total value is a value at or smaller than the total volume of key rate T. The key assignment rate for an application 200 by which the total value exceeds the total volume of key rate T is zero or is the remaining volume of key rate.

The notifier 109 transmits a notification message that the key assignment rate has been changed, to an application 200 whose key assignment rate has been changed (step S105).

Additionally, the notification message is transmitted to all the applications 200 that are newly added or whose degree of priority or the key request rate has changed. Also, the key assignment rate of such an application 200 may also become zero immediately after the addition (or immediately after the change).

Additionally, FIG. 3 illustrates an example where an application 200 whose degree of priority is 3 (application ID: 10.0.0.108:9201) is added to the node 100 which is in operation with four applications 200 connected thereto in advance. In this case, because a key assignment rate of 20 Kbps is preferentially secured for the newly added application 200 (application ID: 10.0.0.108:9201), the key assignment rate of the operating application 200 whose degree of priority is 10 (application ID: 10.0.0.105:8767) changes from 10 Kbps to zero. Accordingly, notification messages are transmitted to the two applications 200 (application ID: 10.0.0.108:9201, application ID: 10.0.0.105:8767).

Figure 5:
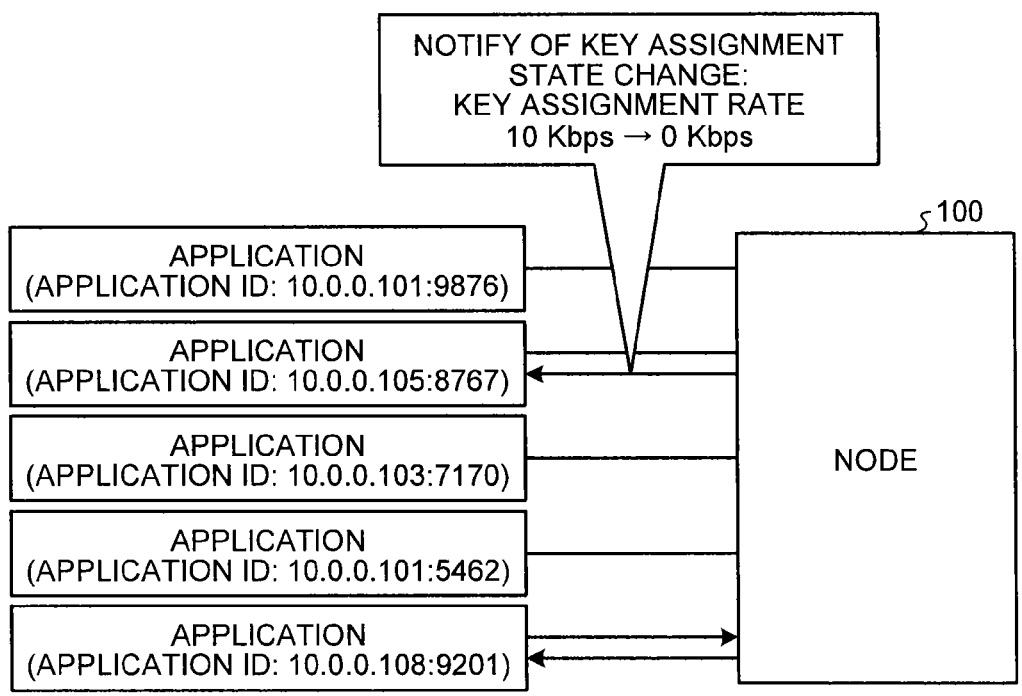
FIG. 5 is a diagram illustrating transmission of a notification message.

FIG. 5 is a diagram illustrating transmission of the notification message. The five applications 200 in FIG. 5 correspond to the applications 200 of the five application IDs in FIG. 3, respectively. When the bottom application 200 (application ID: 10.0.0.108:9201) is added, notification messages are transmitted to the second application 200 (whose degree of priority is 10) (application ID: 10.0.0.105:8767) and the application 200 which has been added (application ID: 10.0.0.108:9201).

Modification

Next, another key assignment method will be described with reference to FIGS. 6 and 7. FIG. 6 is a diagram illustrating an example configuration of application-related information according to a modification.

The different to FIG. 3 is that a minimum key request rate ($M_i$) is added. The minimum key request rate is the key rate whose satisfaction is requested by an application 200 even if the key request rate ($R_i$) of the application 200 is not satisfied. The value of the minimum key request rate is equal to or smaller than the value of the key request rate.

Figure 7:
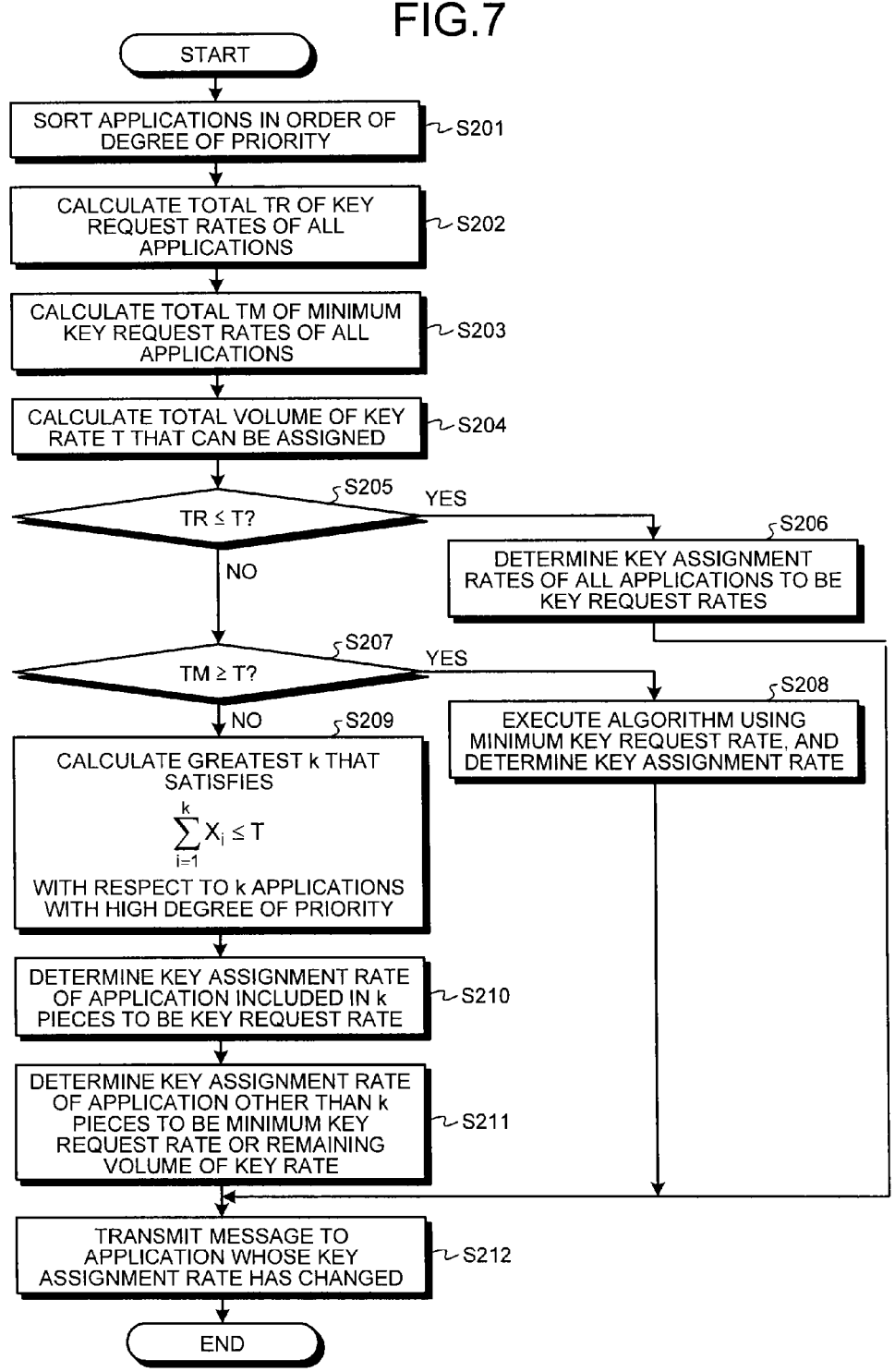
FIG. 7 is a flow chart of a key assignment process according to the modification.

FIG. 7 is a flow chart illustrating an example of a key assignment process according to the present modification. A key assignment algorithm illustrated in FIG. 7 is executed when an application 200 is newly added, or when information about the degree of priority and key request rate of an application 200 is changed, or when the total volume of key rate T that may be assigned is changed by a certain amount or more.

The determiner 108 sorts the applications 200 in the descending order of the degree of priority $P_i$ (step S201). The determiner 108 calculates a total TR of the key request rates of all the applications 200 (step S202). The determiner 108 calculates a total TM of minimum key request rates of all the applications 200 (step S203). The determiner 108 calculates a total volume of key rate T that may be assigned (step S204).

The determiner 108 sets the key assignment rate of each application 200 in the following manner, based on the calculation results of steps S202 to S204.

The determiner 108 determines whether TR is equal to or smaller than T (step S205). In the case where TR is equal to or smaller than T (step S205: Yes), the key request rates of all the applications 200 may be satisfied, and thus, the determiner 108 makes the key assignment rates of all the applications 200 to be the key request rates (step S206).

In the case where TR is greater than T (step S205: No), the determiner 108 determines whether TM is equal to or greater than T (step S207). In the case where TM is equal to or greater than T (step S207: Yes), the minimum key request rates of all the applications 200 are not satisfied. In this case, the determiner 108 uses the minimum key request rates instead of the key request rate, and executes the algorithm illustrated in FIG. 4 (step S208). The determiner 108 thereby assigns a key assignment rate matching the minimum key request rate to all the applications 200, or assigns zero or a key assignment rate which is obtained by subtracting the total value of the minimum key request rates up to the immediately preceding rate from the total volume of key rate T (remaining volume of key rate).

In the case where TM is smaller than T (step S207: No), the determiner 108 calculates the greatest k that satisfies Inequality (2) below with respect to k applications 200 ($1 \leq k \leq N$) with high degree of priority $P_i$ (step S209). Here, $X_i$ is $R_i$ when the application 200 is included in the k pieces, and is $M_i$ when the application 200 is not included in the k pieces.

$$\sum_{i=1}^{k} X_i \leq T \quad (2)$$

The determiner 108 determines the key assignment rate of each application 200 included in the k pieces as the key request rate of the application 200 (step S210). The determiner 108 determines the key assignment rate of an application 200 not included in the k pieces to be the minimum key request rate or the remaining volume of key rate (step S211).

The notifier 109 transmits a notification message that the key assignment rate has been changed, to an application 200 whose key assignment rate has been changed (step S212).

The example in FIG. 6 illustrates a case where an application 200 whose degree of priority is 3 (application ID: 10.0.0.108:9201) is added to the node 100 which is in operation with four applications 200 connected thereto in advance (application-related information 651). In this case, a key assignment rate of 20 Kbps is preferentially secured for the newly added application 200 (application ID: 10.0.0.108: 9201). As a result, the key assignment rate of the application 200 whose degree of priority is 10 (application ID: 10.0.0.105:8767) changes from 10 Kbps to 5 Kbps which is the minimum key request rate. The key assignment rate of the application 200 whose degree of priority is 5, which is second from the lowest (application ID: 10.0.0.103:7170), is changed from 20 Kbps to 15 Kbps. Accordingly, notification messages are transmitted to the three applications 200 including the application 200 which has been added (application ID: 10.0.0.108:9201, application ID: 10.0.0.105:8767, application ID: 10.0.0.103:7170).

Figure 8:
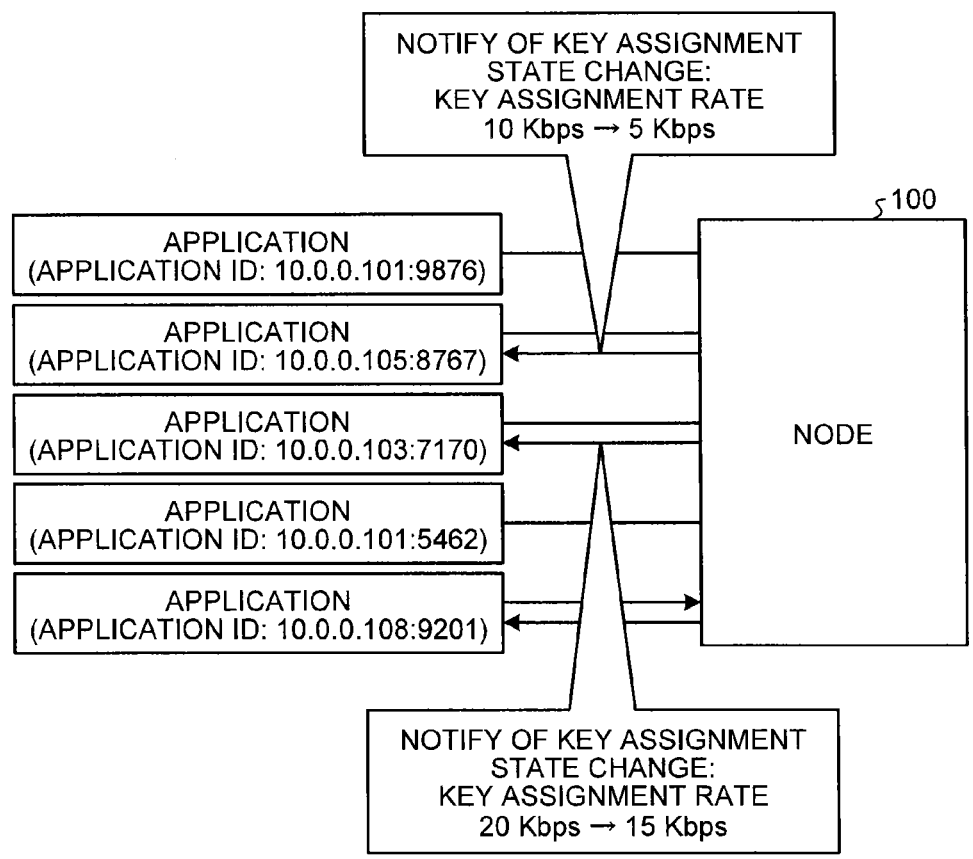
FIG. 8 is a diagram illustrating transmission of a notification message.

FIG. 8 is a diagram illustrating transmission of the notification message. The five applications 200 in FIG. 8 correspond to the applications 200 of the five application IDs in FIG. 6, respectively. When the bottom application 200 (application ID: 10.0.0.108:9201) is added, notification messages are transmitted to the second application 200 (whose degree of priority is 10) (application ID: 10.0.0.105:8767), the third application 200 (whose degree of priority is 5), and the application 200 which has been added (application ID: 10.0.0.103: 7170).

As described above, when an application 200 with a high degree of priority is added, the key request rate of an application 200 with a low degree of priority may not be satisfied. The application 200 grasps this state by receiving a notification message from the node 100. In the following, examples of possible operations (B1 to B5) of the application 200 at the time of reception of the notification message are described.

B1: Do Nothing

The application 200 does not have to do anything specific. Due to falling below the key request rate regarding an application key, the time from issuing an acquisition request for an application key by the application 200 to the node 100 and actually receiving the application key may be increased. This may result in a delay in data transmission/reception at the application 200. However, there are applications 200 for which such a temporal delay is of no significance (batch processing with no time restrictions, etc.), and an option of "do nothing" may be selected.

B2: End of the Application 200

Execution of the application 200 may be ended when satisfaction of the key request rate requested to the node 100 or the minimum key request rate fails and it becomes clear that data throughput or security (or both) expected at the time of start of execution of the application 200 will not be fulfilled.

B3: Change the Execution Mode of the Application 200

In the case where the key assignment rate is reduced, if the amount of communication data may be reduced, execution itself of the application 200 is possibly not affected. For example, in the case of real-time image transmission, the encoding method that is used and parameters such as compression ratio and the like are changed or adjusted. Thus, for example, the same application 200 as before the reduction in the key assignment rate may be executed at the expense of image quality to some extent.

B4: Change of the Encryption Method

Even if the key assignment rate is reduced, if the volume of key that is used (that is, the ratio between the amount of communication data and the volume of key used therefor) is changed, the amount of communication data itself is possibly maintained. For example, in the case where an application 200 that uses OTP (One Time Pad) as the encryption method switches to an encryption method combining a classical encryption technique (for example, an encryption method of using a 128-byte key for every 1024 bytes), the volume of key that is used is, in this case, reduced to one eighth compared to when OTP is used. However, in this case, the security, in its strict sense, is reduced compared to before the change.

B5: Switching to Encryption (Classical Encryption) Not Dependent on Quantum Key Distribution A method is also possible according to which, when the key assignment rate is reduced, communication is performed with classical encryption, without using the application key received from the node 100. If only the classical encryption is used, encrypted data communication at any throughput (after rate control according to the network bandwidth or processing speed) is possible even if the key assignment rate is zero.

Next, a use case (application scenario) where the present embodiment may be applied will be described. In the present embodiment, the node 100 to which a plurality of applications 200 are connected determines the application 200 to which a key is to be assigned, according to the degree of priority of the applications 200. This technology is used in use cases (scenarios) C1 to C3 below, for example.

C1: Operation of the Applications 200 of a Plurality of Users with Different Authorities on the Same Node 100

A higher degree of priority is assigned to the application 200 of a user with more authority. This enables assignment of an application key according to the authority of the user possessing the application 200.

C2: Different Degree of Priority Depending on the Type of Application 200

For example, an image transfer application and an application for transferring confidential data files are considered. In this case, it is assumed that there is a demand to more strictly protect the data of a confidential data file than the image transfer data whose data is redundant. In this situation, a higher degree of priority may be given to the application for transferring the confidential data file. With respect to the image transfer application, the application 200 may be continued by compromising the quality of the image, security or the like to some extent.

C3: Prioritization of the Application 200 for Remotely Managing/Monitoring the Key Generation/Sharing System Software for remotely managing/monitoring the system may also be realized as the application 200 according to the present embodiment. In this case, the security and operation quality of the remote management/monitoring application are sometimes considered more important than the security and operation quality of a general application 200. In this situation, the degree of priority of the remote management/monitoring application is increased, and the degree of priority of a general application is reduced. This enables to preferentially assign a key to the remote management/monitoring application at any time, and to maintain the traffic without restricting the same.

As described above, according to the present embodiment, key assignment according to which the key rate requested by each application is satisfied may be effectively performed.

Figure 9:
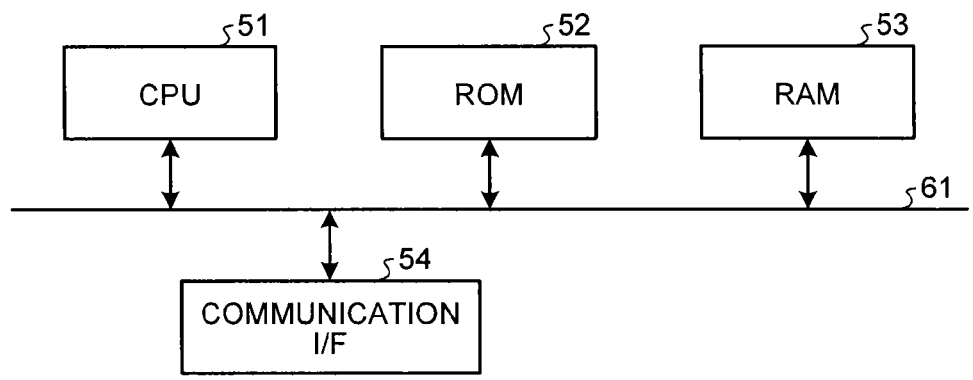
FIG. 9 is a hardware configuration diagram of a communication device according to the embodiment.

Next, a hardware configuration of the communication device according to the present embodiment will be described with reference to FIG. 9. FIG. 9 is an explanatory diagram illustrating a hardware configuration of the communication device according to the present embodiment.

The communication device according to the present embodiment includes a control device such as a CPU (Central Processing Unit) 51, a storage device such as a ROM (Read Only Memory) 52 or a RAM (Random Access Memory) 53, a communication I/F 54 for connecting to a network and performing communication, and a bus 61 for connecting the units.

Programs to be executed by the communication device according to the present embodiment are provided being embedded in the ROM 52 or the like in advance.

The programs to be executed by the communication device according to the present embodiment may alternatively be provided as a computer program product by being recorded in a computer-readable storage medium such as a CD-ROM (Compact Disk Read Only Memory), a flexible disk (FD), a CD-R (Compact Disk Recordable), a DVD (Digital Versatile Disk) or the like in the form of installable or executable files.

Furthermore, the programs to be executed by the communication device according to the present embodiment may be provided by storing the same on a computer connected to a network such as the Internet and downloading the same via the network. Also, the programs to be executed by the communication device according to the present embodiment may be provided or distributed via a network such as the Internet.

The programs to be executed by the communication device according to the present embodiment may cause a computer to function as each of the units (the platform, the link key sharer, the application key sharer, the provider, the controller, the determiner, and the notifier) of the communication device described above. The computer may execute the programs by reading the programs by the CPU 51 from a computer-readable storage medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device, comprising:

a memory configured to store therein a degree of priority and a first requested volume for each of a plurality of applications that use an application key, the plurality of applications connected to one or more external devices, the degree of priority being determined in advance based on a user's authority or the type of application, the first requested volume indicating a volume of the application key requested by each of the plurality of applications, the application key being shared with the one or more external devices over one or more links that are encrypted with a link key, the link key being shared by using a quantum key distribution technique;

circuitry configured to determine a volume of the application key to be assigned to each application in such a way that a first total value that is a total of the volume of the application key to be assigned to the application is equal to or smaller than a second total value that is a total value of a volume of the application key assignable, that the application key of the first requested volume is preferentially assigned to the application whose degree of priority is higher, and that the application key of the first requested volume or less is assigned to the application whose degree of priority is lower; and the circuitry further configured to assign the application key to the plurality of applications accordingly, wherein two or more of the applications are connected to a single one of the one or more external devices.

2. The device according to claim 1, wherein the memory further stores therein a second requested volume that indicates the volume of the application key requested by the application and that is smaller than the first requested volume, and the circuitry determines the volume of the application key to be assigned to each application when a total of the second requested volume is smaller than the second total value in such a way that the first total value is equal to or smaller than the second total value, that the application key of the second requested volume is preferentially assigned to the application whose degree of priority is higher, and that the application key of the second requested volume or less is assigned to the application whose degree of priority is lower.

3. The device according to claim 1, wherein the memory further stores therein a second requested volume that is a requested volume of the application key requested by the application and that is smaller than the first requested volume, and the circuitry determines the volume of the application key to be assigned to each application in such a way that the first total value is equal to or smaller than the second total value, that the application key of the first requested volume is preferentially assigned to the application whose degree of priority is higher, and that the application key of the second requested volume or less is assigned to the application whose degree of priority is lower.

4. The device according to claim 1, wherein the circuitry is further configured to notify the application whose volume of the application key has been changed of the volume of the application key being changed.

5. The device according to claim 1, wherein the memory stores therein the degree of priority and the first requested volume received from the application.

6. The device according to claim 1, wherein the circuitry determines the volume of the application key to be assigned to each application, at least one of when the application is connected, when the first requested volume requested by the application is changed, and when the second total value is changed.

7. A communication method implemented in a communication device, comprising:

storing, by a memory of the communication device, a degree of priority and a first requested volume for each of a plurality of applications that use an application key, the plurality of applications connected to one or more external devices, the degree of priority being determined in advance based on a user's authority or the type of application, the first requested volume indicating a volume of the application key requested by each of the plurality of applications, the application key being shared with the one or more external devices over one or more links that are encrypted with a link key, the link key being shared by using a quantum key distribution technique;

determining, by at least one processor of the communication device, a volume of the application key to be assigned to each application in such a way that a first total value that is a total of the volume of the application key to be assigned to the application is equal to or smaller than a second total value that is a total value of a volume of the application key assignable, that the application key of the first requested volume is preferentially assigned to the application whose degree of priority is higher, and that the application key of the first requested volume or less is assigned to the application whose degree of priority is lower; and the circuitry further configured to assign the application key to the plurality of applications accordingly, wherein two or more of the applications are connected to a single one of the one or more external devices.

8. A communication system, comprising:

a plurality of applications that use an application key, the plurality of applications connected to one or more external devices, the application key being shared with the one or more external devices over one or more links that are encrypted with a link key, the link key being shared by using a quantum key distribution technique;

a communication device for providing the application key to the one or more applications, wherein the communication device includes a memory that stores therein a degree of priority and a first requested volume for each of the plurality of applications, the degree of priority being determined in advance based on a user's authority or the type of application, the first requested volume indicating a volume of the application key requested by each of the plurality of applications; and circuitry configured to determine a volume of the application key to be assigned to each application in such a way that a first total value that is a total of the volume of the application key to be assigned to the application is equal to or smaller than a second total value that is a total value of a volume of the application key assignable, that the application key of the first requested volume is preferentially assigned to the application whose degree of priority is higher, and that the application key of the first requested volume or less is assigned to the application whose degree of priority is lower; and the circuitry further configured to assign the application key to the plurality of applications accordingly, wherein two or more of the applications are connected to a single one of the one or more external devices.

\* \* \* \* \*